United States Patent [19]
Longhart

[11] Patent Number: 5,574,080
[45] Date of Patent: Nov. 12, 1996

[54] BUILDING MATERIAL SHEETING

[76] Inventor: Darwin J. Longhart, 3786 Rosemary La., Conyers, Ga. 30208

[21] Appl. No.: 578,215

[22] Filed: Dec. 26, 1995

[51] Int. Cl.⁶ .......................... C08L 89/06; C08L 27/04; C08L 77/02; C08L 77/04
[52] U.S. Cl. .......................... 524/11; 525/178; 525/416
[58] Field of Search .............................. 524/11; 525/178, 525/416

[56] References Cited

U.S. PATENT DOCUMENTS 4,546,024 10/1985 Brown ........................................ 428/44

*Primary Examiner*—W. Robinson H. Clark

[57] ABSTRACT

A building material including reclaimed leather, neoprene, and nylon. The reclaimed materials are shredded and blended together with a matrix material. The matrix material is a polymeric adhesive. The chips with the matrix material are heated to form a uniform mixture. The uniform mixture is then molded into the building material sheets.

5 Claims, 2 Drawing Sheets

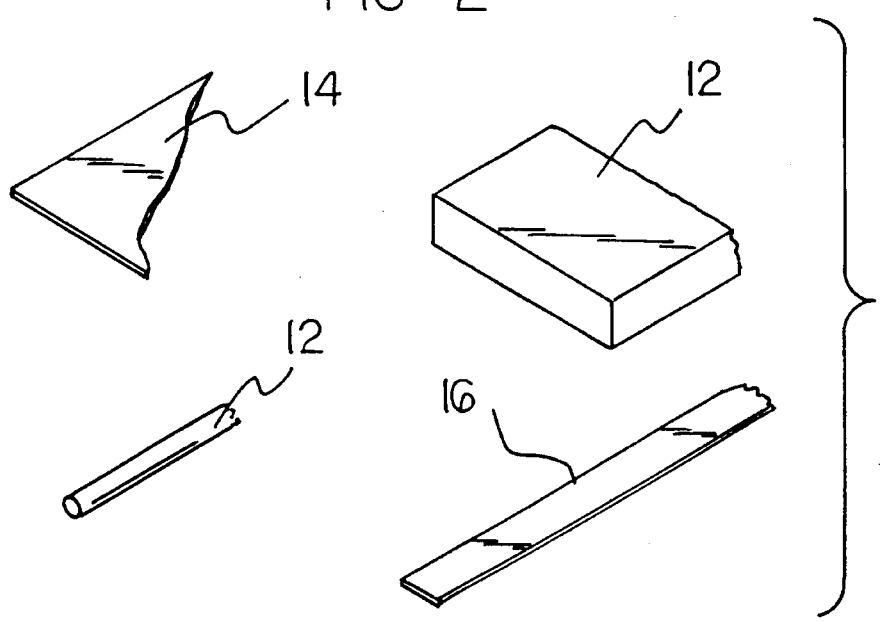
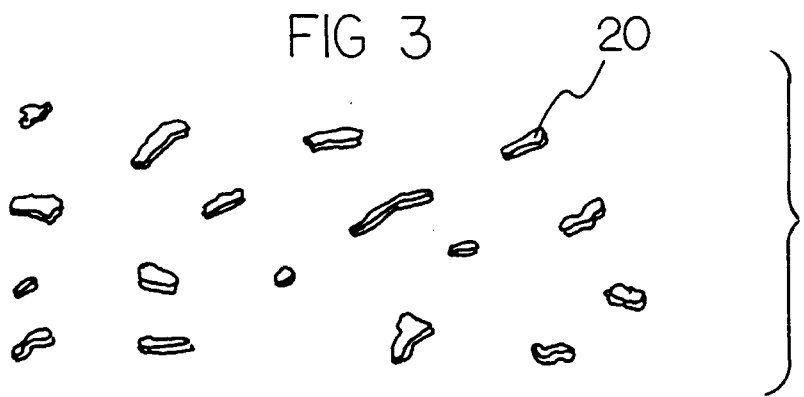
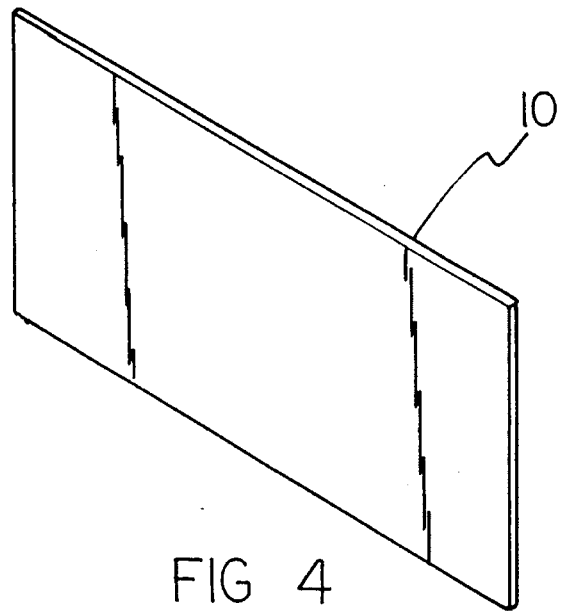

BUILDING MATERIAL SHEETING

BACKGROUND OF THE INVENTION

1. Field of the Invention

The present invention relates to a building material sheeting and more particularly pertains to reclaiming scrap trimmings discarded from shoe repair and shredding the scraps for combining with a polymeric adhesive to be heated and cured to form building material sheeting.

2. Description of the Prior Art

The use of recycled plastic is known in the prior art. More specifically, recycled plastic heretofore devised and utilized for the purpose of making recycled material are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,356,939 to Burrowes, Purviance, Quiner, and Stork discloses a process for making rubber articles and rubber articles made thereby. U.S. Pat. No. 5,346,934 to Chriss discloses a footwear additive made from recycled materials. U.S. Pat. No. 5,324,769 to Richards and Kelley discloses a thermally stable blend of polyphenylene ether, diene based rubber and an antioxidant/metal deactivator. U.S. Pat. No. 5,221,702 to Richards discloses a composite block and process for manufacturing. Lastly, U.S. Pat. No. 4,244,841 to Frankland discloses a method for recycling rubber and recycled rubber products.

While these devices fulfill their respective, particular objectives and requirements, the aforementioned patents do not describe building material sheeting that allows reclaim scraps from shoe repair to be used to form a uniform mixture with a polymeric heat adhesive as the matrix material to form building material sheeting.

In this respect, the building material sheeting according to the present invention substantially departs from the conventional concepts and designs of the prior art, and in doing so provides an apparatus primarily developed for the purpose of reclaiming scrap trimmings discarded from shoe repair and shredding the scraps for combining with a polymeric adhesive to be heated and cured to form building material sheeting.

Therefore, it can be appreciated that there exists a continuing need for a new and improved building material sheeting which can be used for reclaiming scrap trimmings discarded from shoe repair and shredding the scraps for combining with a polymeric adhesive to be heated and cured to form building material sheeting. In this regard, the present invention substantially fulfills this need.

SUMMARY OF THE INVENTION

In view of the foregoing disadvantages inherent in the known types of recycled plastic now present in the prior art, the present invention provides an improved building material sheeting. As such, the general purpose of the present invention, which will be described subsequently in greater detail, is to provide a new and improved building material sheeting and method which has all the advantages of the prior art and none of the disadvantages.

To attain this, the present invention essentially comprises reclaimed leather in a portion of about twenty percent to about thirty percent by volume, neoprene in a proportion of about the percent to about twenty-five percent by volume, and nylon in a proportion of about forty-five percent to about sixty percent by volume. The reclaimed material is combined with a polymeric adhesive in a proportion of about five percent to about thirty percent by volume. The reclaimed material is shredded into various chip sizes prior to being mixed with the polymeric adhesive. The mixture is heated and allowed to cure in a mold.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved building material sheeting which has all of the advantages of the prior art recycled plastic and none of the disadvantages.

It is another object of the present invention to provide a new and improved building material sheeting which may be easily and efficiently manufactured and marketed.

It is further object of the present invention to provide a new and improved building material sheeting which is of durable and reliable constructions.

An even further object of the present invention is to provide a new and improved building material sheeting which is susceptible of a low cost of manufacture with regard to both materials and labor, and which accordingly is then susceptible of low prices of sale to the consuming public, thereby making such building material sheeting economically available to the buying public.

Still yet another object of the present invention is to provide a new and improved building material sheeting which provides in the apparatuses and methods of the prior art some of the advantages thereof, while simultaneously overcoming some of the disadvantages normally associated therewith.

Even still another object of the present invention is to provide a building material sheeting for reclaiming scrap trimmings discarded from shoe repair and shredding the scraps for combining with a polymeric adhesive to be heated and cured to form building material sheeting.

Lastly, it is an object of the present invention to provide a new and improved building material including reclaimed leather, neoprene, and nylon. The reclaimed materials are shredded and blended together with a matrix material. The matrix material is a polymeric adhesive. The chips, with the matrix material, are heated to form a uniform mixture. The uniform mixture is then molded into the building material sheets.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is an elevational view of the reclaimed shoe repair material.

FIG. 3 is an elevational view of the chips of the scrap material of FIG. 2.

FIG. 4 is an isometric view of the building material sheeting of the present invention.

The same reference numerals refer to the same parts through the various Figures.

DESCRIPTION OF THE PREFERRED EMBODIMENT

Figure 1:
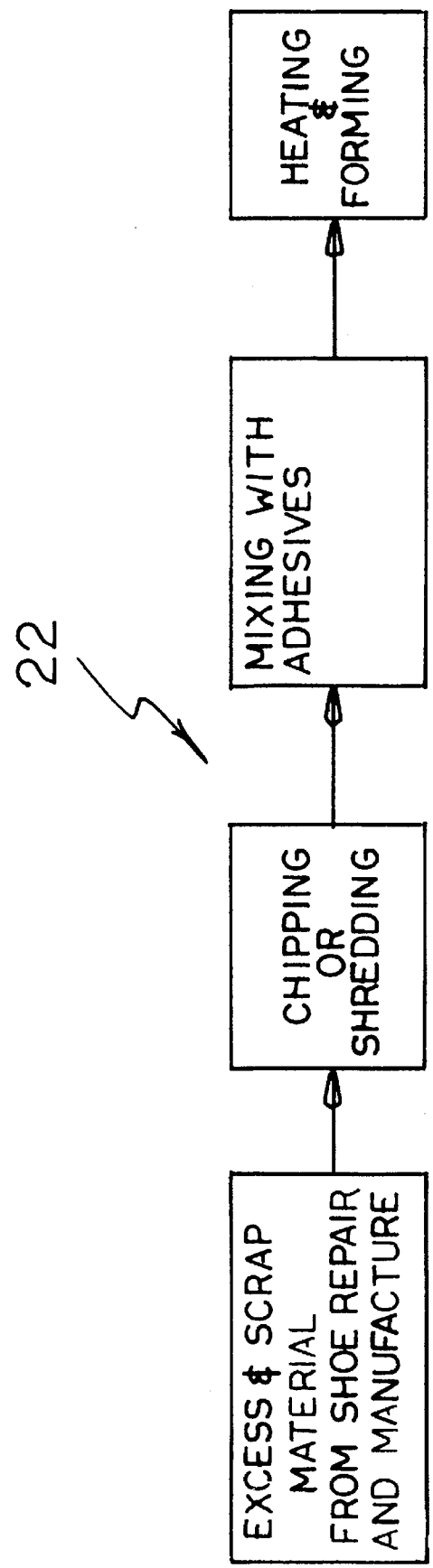
FIG. 1 is a flow chart of the process for manufacturing the building material sheeting in accordance with the principals of the present invention.

With reference now to the drawings, and in particular to FIG. 4 thereof, the preferred embodiment of the new and improved building material sheeting embodying the principles and concepts of the present invention and generally designated by the reference numeral 10 will be described.

The present invention, the building material sheeting 10 is comprised of a plurality of components. Such components in their broadest context include a neoprene, leather, nylon, and a matrix material. Such components are individually configured and correlated with respect to each other so as to attain the desired objective.

Specifically, the present invention includes a collection of scraps of leather 12, neoprene 14, and nylon 16. The scraps are retrieved for recycling from the shoe repair process. Other scraps that may be used when collected from the shoe repair may consist of natural rubber, synthetic and natural fibers. The scraps may be collected in bins at the shoe repair shop or in boxes where the scraps must be keep separate from paper.

The collected scraps are shredded into various chip sizes. As shown in FIG. 3, the chips 20, also vary in shape. Generally, the leather chips have a chip size of three millimeters. The neoprene chips have a chip size of about two millimeters. And the nylon chips have a chip size of about four millimeters. The sizes of chips are important in the formation of the uniform material. Additionally, the size of the chips are important with regard to the strength of the final building material sheeting produced in the process.

The reclaimed material, used in the process of the present invention, is leather, neoprene, and nylon. The reclaimed material that can be used in this process is not limited by those materials. The reclaimed material is any material that is reclaimed from the shoe repair process, and those materials may be comprised of foam polyester, polyurethene, material rubber, and other forms of synthetic rubber, synthetic fibers and cotton. Preferably, the recycled material is neoprene, nylon, and leather.

As shown in FIG. 1, the process steps 22, once the material is shredded into chips sizes, the material is mixed with a polymeric adhesive. The primary adhesive used as the matrix material may be chosen from the following group consisting of epoxy, thermal-plastic resin, or thermal-plastic resin combined with thermal setting resin. For the present invention, the polymeric is preferably a thermal-plastic resin combined with the thermal setting resin. This particular polymeric adhesive allows the reclaimed material to bond by way of a primary bonding assembly of elements to produce the building material sheeting.

Once the chips of leather, neoprene, and nylon, with the polymeric adhesive, are mixed in a mixing drum, the chips and the adhesive are blended and heated to a temperature of about one hundred and seventy degrees Fahrenheit. This temperature allows a uniform mixture to form between the nylon, neoprene, and adhesive with the leather chips dispersed throughout the uniform mixture. The actual chemical make-up of the reclaimed material with the adhesive is unknown because the recycled material, is not a newly formed chemical composition. In the present process, the leather is about twenty-five percent by volume, the neoprene is about fifteen percent by volume, the nylon is about fifty percent by volume and the polymeric adhesive is about five percent by volume.

The polymeric adhesive is chosen as a mixture of thermal-plastic resin combined with thermal setting resin because of its ability to adhere to and to maintain a bonding between the dissimilar materials. This particular mixture of polymeric adhesive material is a polyfunctional adhesive that has an affinity for a wide variety of materials such as the ones that we have used in the present invention. The thermal-plastic resin combined with thermal setting resin gives us building sheeting that has a high degree of strength of joint with a resiliency which enables the newly formed building sheeting to withstand differential expansion and contraction of the dissimilar materials combined therein.

The uniform mixture that is formed with the blending and heating of the chips with the adhesive is allowed to reach a stabilizing temperature of about one hundred and sixty-five degrees Fahrenheit. The stabilizing temperature is important for the subsequent formation of the building material sheets. The uniform mixture is then discharged into a mold for curing.

Finally, once the uniform mixture is placed into the molding, the mixture is allowed to cure within the molding to a desired size. The building material sheeting formed through the manufacturing process will have a variety of colors because the reclaimed material used will have a variety of colors.

The present invention provides and economical and environmentally safe building material sheeting. The building material sheeting if formed from reclaimed leather, nylon, and neoprene. The reclaimed materials are bonded through a primary bonding assembly with a thermal-plastic resin and a thermal setting resin mixture. The newly formed bonding material sheeting may be used for various building application such as molding, signing, paneling, exterior or interior surfaces of walls, and things of that nature. The building material sheeting is such that it accepts paint for covering the multi-colored sheeting.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved building material sheeting for use as siding and underlayment comprising in combination:

reclaimed leather in a portion of about 20% to about 35% by volume, neoprene in a proportion of about 10% to about 25% by volume, nylon in a proportion of about 45% to 60% by volume, and a polymeric adhesive in a proportion of about 5% to 30% by volume.

2. The sheets as set forth in claim 1 wherein the leather being in proportion of about 25% by volume, the neoprene being in proportion of about 15% by volume, the nylon being in proportion of about 50% by volume, and the polymeric adhesive being in proportion of about 5% by volume.

3. The sheets as set forth in claim 1 wherein the leather, the neoprene and the nylon being reclaimed scraps from shoe repair.

4. The sheets as set forth in claim 1 wherein the leather having a chip size of 3 mm, the neoprene having a chip size of 2mm and the nylon having a chip size of 4 mm.

5. A process for manufacturing building material sheeting, comprising the steps of:

collecting scraps of leather, neoprene and nylon;

shredding the scraps of leather, neoprene and nylon into chips having an average chip size within the range of about 1 mm to 5 mm with a deviation of less than about 30% form the average chip size;

mixing of the chips of leather, neoprene and nylon with a polymeric adhesive formed of thermoplastic resin combined with thermosetting resin in a mixing drum;

blending and heating the chips and the adhesive at a temperature of about 170° Fahrenheit until a uniform mixture being formed of the nylon, neoprene and adhesive and having the leather chips dispursed within;

allowing the mixure to temperature stabilize at a temperature of about 165° Fahrenheit for subsequent formation of building material sheets;

discharging portions of the mixture into a mold for curing; and curing the mixture in a mold of desired size for formation of the building material sheeting.

* * * * *